United States Patent [19]

Minamizaki

[11] Patent Number: 6,099,900
[45] Date of Patent: Aug. 8, 2000

[54] METHOD FOR TACKIFYING SURFACE OF SOFT LAYER

[75] Inventor: Yoshihiro Minamizaki, Osaka, Japan

[73] Assignee: Nitto Denko Corporation, Osaka, Japan

[21] Appl. No.: 09/283,981

[22] Filed: Apr. 2, 1999

[30] Foreign Application Priority Data

Apr. 24, 1998 [JP] Japan ................................. 10-115525

[51] Int. Cl.⁷ ........................................ B05D 5/10
[52] U.S. Cl. ...................................... 427/208.8; 427/407.1
[58] Field of Search ............................... 427/208.8, 407.1

[56] References Cited

U.S. PATENT DOCUMENTS 3,914,484  10/1975  Creegan et al. .
5,194,486   3/1993  Levine et al. .

FOREIGN PATENT DOCUMENTS 2085696   7/1993  Canada .
0 209 337 A2  1/1987  European Pat. Off. .
0209337       1/1987  European Pat. Off. .

OTHER PUBLICATIONS

PCT/US81/01062, Apr. 15, 1982, Zenk, Apr. 15, 1982, Transfer Tape Having Adhesive Formed From Two Laminae, pp. 1–10.

XP–002119738 –Abstract (No date available).

European Search Report ( No date available).

*Primary Examiner*—Bernard Pianalto
*Attorney, Agent, or Firm*—Sughrue, Mion, Zinn, Macpeak & Seas, PLLC

[57] ABSTRACT

A method for tackifying the surface of a soft layer, which comprises tackifying the surface of the soft layer by an interfacial contact reaction between the soft layer or a reactive interlayer provided thereon, and a pressure-sensitive adhesive layer. Since sufficient adhesion can be obtained with a reduced thickness of the pressure-sensitive adhesive layer, the merits of the soft layer are not impaired.

6 Claims, No Drawings

METHOD FOR TACKIFYING SURFACE OF SOFT LAYER

FIELD OF THE INVENTION

This invention relates to a method for tackifying the surface of a soft layer provided on a substrate, e.g., a plastic film, paper or cloth.

BACKGROUND OF THE INVENTION

Pressure-sensitive adhesive sheets comprising a substrate, such as a plastic film, paper or cloth, and having provided thereon a soft layer comprising a rubbery polymer or a foamed product thereof which is excellent in softness, fluidity and stress relaxing properties have widely been used as tacky articles having such properties of the soft layer. Depending on the material of the soft layer, those are used as tacky articles which exhibit the above properties even in low temperature, or as inexpensive tacky articles.

The soft layer of this type of tacky articles has bulk physical properties necessary for an adhesive, but pressure-sensitive property of the surface thereof is not yet sufficient. Therefore, in order to obtain sufficient pressure-sensitive property, a pressure-sensitive adhesive layer comprising an acrylic pressure-sensitive adhesive or a rubber pressure-sensitive adhesive is further coated on the surface of the soft layer.

However, if the pressure-sensitive adhesive layer is coated in a thickness of several tens of microns to several millimeters in order to exhibit the desired pressure-sensitive properties, it results in impairing the softness, fluidity and stress relaxing properties, which are advantageous characteristics of the soft layer. On the other hand, if the thickness is decreased to avoid this, the pressure-sensitive adhesive diffuses into the soft layer with the passage of time, decreasing the pressure-sensitive property, or an interlaminar failure occurs between the soft layer and the pressure-sensitive adhesive layer. As a result, a sufficient adhesive strength is not exhibited.

SUMMARY OF THE INVENTION

In the light of the above circumstance, an object of the present invention is to provide a surface treatment method for improving pressure-sensitive property of the surface of a soft layer while maintaining the merits of the soft layer. More specifically, the object of the present invention is to a method for tackifying the surface of a soft layer.

As a result of extensive study for the above object, the present inventor has found that if a pressure-sensitive adhesive layer is introduced into the surface of a soft layer and fixed thereon by an interfacial contact reaction, pressure-sensitive property of the surface can be improved while maintaining the merits of the soft layer. The present invention has been completed based on this finding.

The present invention provides a method for tackifying the surface of a soft layer, which comprises tackifying the surface of the soft layer by an interfacial contact reaction between the soft layer and a pressure-sensitive adhesive layer provided thereon.

In a preferred embodiment of the invention, the pressure-sensitive adhesive layer has a thickness of 10 $\mu$m or smaller, particularly 1 $\mu$m or smaller.

In another preferred embodiment, the interfacial contact reaction is a reaction taking place between a reactive functional group contained in the soft layer and the pressure-sensitive adhesive layer having a reactive functional group capable of reacting with the functional group of the soft layer, or a reaction taking place between a reactive interlayer previously provided on surface of the soft layer and the pressure-sensitive adhesive layer.

In further preferred embodiment of the invention, the reactive interlayer comprises a polyamine having a primary or secondary amino group.

In further preferred embodiment of the invention, the interfacial contact reaction is a reaction between a primary or secondary amino group and a functional group selected from the group consisting of an isocyanate group, an epoxy group, an acid chloride group, a vinyl group, and an acid anhydride group.

According to the present invention, tackiness is imparted to the surface of a soft layer by an interfacial contact reaction between the soft layer and a pressure-sensitive adhesive layer. Therefore, even where the pressure-sensitive adhesive layer is as thin as 10 $\mu$m or smaller, particularly 1 $\mu$m or smaller that is achieved by immersion coating, the surface adhesion of the soft layer can be greatly improved while maintaining the favorable characteristics of the soft layer such as softness, fluidity and stress relaxing properties, without involving problems such as diffusion of the pressure-sensitive adhesive into the soft layer and an interlaminar failure between the pressure-sensitive adhesive layer and the soft layer.

DETAILED DESCRIPTION OF THE INVENTION

In the present invention, a soft layer is generally formed on a substrate, such as a plastic film, paper, cloth, metal foil, or a separator, by means of, for example, hot-melt coating, calender coating, extrusion coating, roll coating, or a like coating technique, thereby providing various tacky articles, such as a pressure-sensitive adhesive tape, a pressure-sensitive adhesive sheet, and a pressure-sensitive adhesive label. The thickness of the soft layer is appropriately decided within a range of from several microns to several millimeters depending on the use. If curing is necessary after coating, the soft layer may be subjected to curing treatment by applying heat, ultraviolet rays, electron rays, moisture, etc., thereto. A soft layer which is difficult to form by solventless coating can be provided by coating the substrate with a solution or dispersion of a coating material in water or an organic solvent, followed by removing water or organic solvent by drying.

Materials which can be used as a soft layer are polymers which exhibit bulk physical properties required as a pressure-sensitive adhesive, such as softness, fluidity and stress relaxing properties, and yet have insufficient surface adhesion. Such polymers include natural rubber, polyisoprene, polybutadiene, butyl rubber, polyisobutylene, chloroprene rubber, styrene-butadiene rubber, a styrene-isoprene-styrene block copolymer and a hydrogenated product thereof, a styrene-butadiene-styrene block copolymer and a hydrogenated product thereof, a styrene-isobutylene-styrene block copolymer, silicone rubber, polyurethane, polyester, and polyether.

Where the bulk physical properties necessary as a pressure-sensitive adhesive, such as softness, fluidity and stress relaxing properties, are insufficient in using a polymer alone, a softener or plasticizer, such as process oil, a liquid resin, a liquid rubber, polybutene or dioctyl phthalate, can be added appropriately to the polymer, or the polymer can be made porous by foaming. If desired, the polymer may appropriately contain an antioxidant, a filler, a pigment, a crosslinking agent, a small amount of a tackifying resin, and the like.

Where the material of a soft layer is a thermoplastic polymer, the soft layer can be formed by hot-melt coating the polymer on a substrate without using an organic solvent. When a heat-curing, ultraviolet-curing, electron radiation-curing or moisture-curing polymer or oligomer is used, the soft layer can be formed by applying the polymer or oligomer to a substrate without using an organic solvent and curing the coating layer by the respective curing means. In the case of a polymer whose glass transition temperature is lower than that of conventional pressure-sensitive adhesives, such as silicone rubber, a soft layer which exhibits softness, fluidity and stress relaxing properties even in very low temperature can be formed. use of a polymer containing inexpensive process oil or liquid resin makes it possible to form an inexpensive soft layer.

According to the method of the invention, the surface of the soft layer thus formed on a substrate is tackified by subjecting the surface to an interfacial contact reaction usually with a pressure-sensitive adhesive layer provided thereon. More specifically, the solid phase or semi-solid phase of the soft layer and a liquid, semi-solid or solid phase containing a pressure-sensitive adhesive are brought into contact to undergo an interfacial contact reaction to make the surface of the soft layer tacky.

The pressure-sensitive adhesive which can be used in the present invention is not particularly limited, and any conventional pressure-sensitive adhesives, such as acrylic adhesives and rubber adhesives, can be used. If desired, the pressure-sensitive adhesive can appropriately contain tackifying resins or additives. useful tackifying resins include rosin derivatives, terpene resins, styrene resins, xylene resins, phenol resins, coumarone-indene resins, aliphatic petroleum resins, aromatic petroleum resins, and hydrogenation products thereof. Useful additives include softeners or plasticizers, such as process oil, liquid resins, liquid rubber, polybutene, and dioctyl phthalate; antioxidants, fillers, pigments, and crosslinking agents.

The acrylic pressure-sensitive adhesives comprise, as a base polymer, a copolymer of a monomer mixture mainly comprising an alkyl (meth)acrylates, e.g., butyl acrylate, 2-ethylhexyl acrylate, isooctyl acrylate, isononyl acrylate, and ethyl acrylate, and a modifier monomer, e.g., vi nyl acetate, acrylonitrile, styrene, methyl methacrylate, acrylic acid, maleic anhydride, vinylpyrrolidone, glycidyl methacrylate, dimethylaminoethyl methacrylate, hydroxyethyl acrylate, and acrylamide.

The rubber pressure-sensitive adhesives comprise, as abase polymer, a rubbery polymer, such as natural rubber, a styrene-isoprene-styrene block copolymer and a hydrogenated product thereof, a styrene-butadiene-styrene block copolymer and a hydrogenated product thereof, styrene-butadiene rubber, polybutadiene, polyisoprene, polyisobutylene, butyl rubber, chloroprene rubber, and silicone rubber.

An interfacial contact reaction of a liquid phase containing the adhesive can be carried out by applying the liquid phase to the soft layer by dipping, immersion or by means of an applicator such as a kiss-roll coater, a roll coater, a squeeze coater or a spin coater. In the above application, if the surface of the soft polymer dissolves or largely swells, sufficient pressure-sensitive adhesive properties are not obtained. Therefore, it is desirable to select an appropriate solvent. If the pressure-sensitive adhesive is hot-melt adhesives, ultraviolet-polymerizable adhesives or reactive oligomer type adhesives, it is applied without using a solvent and, if necessary, cured by an appropriate means.

The pressure-sensitive adhesive layer thus formed on the soft layer preferably has a thickness of 10 $\mu$m or less, and more preferably 1 $\mu$m or less. If the thickness of the pressure-sensitive adhesive layer is too large, softness, fluidity and stress relaxing properties, which are the merits of the soft layer, are not sufficiently exhibited.

The interfacial contact reaction is usually induced between a reactive functional group of the soft layer and the pressure-sensitive adhesive layer containing a reactive functional group capable of reacting with the functional group of the soft layer. As a result of such an interfacial contact reaction, the soft layer and the pressure-sensitive adhesive layer are firmly fixed to each other through a chemical bond, such as a covalent bond, a coordinate bond, a hydrogen bond, an ionic bond, and a metal bond. Therefore, even where the adhesive layer has a small thickness as described above, problems do not occur that the pressure-sensitive adhesive diffuses into the soft layer with the passage of time or an interlaminar failure occurs between the soft layer and the pressure-sensitive adhesive layer, resulting in a reduction in adhesion strength.

It is preferred that the interfacial contact reaction proceeds in a short period of time. From this viewpoint, preferred combinations of the reactive functional groups of the soft layer and the pressure-sensitive adhesive layer are reactions between a primary amino group or a secondary amino group and a functional group selected from the group consisting of an isocyanate group, an epoxy group, an acid chloride group, a vinyl group, and an acid anhydride group. Other than the above combinations, a reaction between a carboxyl group and an aziridine group, a reaction between a hydrosilyl group and a hydroxyl group or a vinyl group, a reaction between an epoxy group and an acid anhydrous group, and a reaction between an acid chloride group and a hydroxyl group or a mercapto group are preferred.

In order to contain such a reactive functional group in a soft layer for conducting such an interfacial contact reaction, the reactive functional group is incorporated into the polymer constituting the soft layer through copolymerization, side chain modification, graft reaction or a like means or a compound having the reactive functional group is compounded with the polymer. More preferably, a thin layer of a polymer or compound containing the above-described reactive functional group is formed on the surface of the soft layer by an interfacial contact reaction or a diluted solution coating method, thereby forming a reactive interlayer. It is particularly desirable that the reactive interlayer be comprised of a polyamine having a primary or secondary amino group.

The reactive interlayer comprising a polyamine having a primary or secondary amino group can be formed by first forming a soft layer containing an isocyanate group, an epoxy group or an acid chloride group and then bringing the soft layer into contact with an aqueous solution of a polyamine, such as polyethylene imine, polyvinyl amine or polyallyl amine, to cause an interfacial contact reaction therebetween, whereby the primary or secondary amine-containing polyamine is fixed-onto the surface of the soft layer. Part of the primary or secondary amino group of the polyamine is consumed by the interfacial contact reaction with the soft layer, and the high reactivity of the remaining amino group is made use of for the interfacial contact reaction with the pressure-sensitive adhesive layer provided on the reactive interlayer.

The reactive functional group to be contained in the pressure-sensitive adhesive layer is a group reacting with the reactive functional group of the soft layer, and can be introduced into the base polymer of the pressure-sensitive adhesive by copolymerization, side chain modification, graft reaction, and the like or by compounding the base polymer with a compound having the reactive functional group.

The present invention will now be described in more detail with reference to Reference Examples and Examples, but it should be understood that the invention is not construed as being limited thereto. Unless otherwise noted, all the parts and percents are by weight. The adhesion of the samples prepared was evaluated as follows.

1) Adhesion before High Temperature Exposure

A sample was adhered at 23° C. to a stainless steel plate (SUS 304BA) the adherent surface of which had been cleaned, and pressed by giving one stroke of a rubber roller weighing 2 kg. After being allowed to stand at 23° C. for about 20 minutes, the sample was peeled at a peel angle of 180° at a pulling speed of 300 mm/min to measure a peel strength.

2) Adhesion after High Temperature Exposure

A sample adhered to a stainless steel plate and pressed with a roller as described above was aged in a thermostat kept at 50° C. for 3 days and then subjected to a peel test in the same manner as described above.

REFERENCE EXAMPLE 1

A hundred parts of New Pole PP-4000 (polypropylene glycol type diol produced by Sanyo chemical Industries, Ltd.; average molecular weight: 4,000) were mixed with 11.8 parts of Coronate HX (isocyanurate-modified hexamethylene diisocyanate produced by Nippon Polyurethane Industry Co., Ltd.; isocyanate content: 21.3%) (NCO/OH molar ratio: 1.25), and 0.1 part of dibutyltin dilaurate was added thereto as a curing agent, followed by stirring.

The resulting composition was applied to a 25 μm thick polyester film with an applicator to a coating thickness of 40 μM and cured by heating in an oven at 70° C. for 10 minutes to form soft layer 1 comprising soft polyurethane. After the sheet was allowed to stand at room temperature for at least 1 week while keeping the soft layer untouched, the adhesion was measured. The adhesion before high temperature exposure (after 20 minutes' standing at 23° C.) was found to be 5 g/20 mm-width or lower.

REFERENCE EXAMPLE 2

Soft layer 1 was formed in the same manner as in Reference Example 1. within 3 hours from the formation of the soft layer, that is, while the isocyanate group in soft layer 1 was still sufficiently active, the sheet was immersed in an aqueous solution containing 0.2 g of PAA-10C (polyallylamine produced by Nitto Boseki Co., Ltd.; molecular weight: 10,000) per 1,000 ml for 1 minutes to conduct an interfacial contact reaction. The sheet thus treated was rinsed with pure water, air-dried, and left to stand at room temperature with the treated side of soft layer 1 being untouched, whereby a reactive interlayer consisting of polyallylamine was formed on the surface of soft layer 1. After the sheet was allowed to stand at room temperature for at least 1 week with the reactive interlayer untouched, the adhesion of the interlayer was measured. The adhesion before high temperature exposure was 5 g/20 mm-width or lower.

REFERENCE EXAMPLE 3

Soft layer 1 was formed in the same manner as in Reference Example 1. After being allowed to stand at room temperature for about 1 week, the sheet was immersed in an ethyl acetate solution containing 5 g of adhesive 1 shown below per 1,000 ml for about 30 seconds. The sheet was taken out, and the ethyl acetate was removed by drying. After the sheet was allowed to stand at room temperature for about 1 week with the adhesive-treated side untouched, the adhesion before high temperature exposure was found to be 5 g/20 mm-width or less.

Preparation of Pressure-Sensitive Adhesive 1:

In a 500 ml four-necked flask equipped with stirring blades, a thermometer, a tube for introducing nitrogen gas, a condenser, and a dropping funnel were put 100 g of 2-ethylhexyl acrylate, 5 g of acrylic acid, 0.3 g of glycidyl methacrylate, 0.2 g of benzoyl peroxide, and 129 g of ethyl acetate. Nitrogen gas was introduced into the mixture while stirring gently, and the inner temperature was raised to 75° C. to initiate polymerization. Heat generation started several minutes later. The inner temperature was maintained at around 75° C. by controlling the outer bath temperature.

After about 6 hours from the commencement of polymerization, 29 g of ethyl acetate was dropped into the flask while stirring to prepare a polymer solution comprising a 2-ethylhexyl acrylate-acrylic acid-glycidyl methacrylate copolymer (solid content: 40%). AS a result of gel-permeation chromatography (GPC), the copolymer was found to have a weight average molecular weight of 368,000 and a number average molecular weight of 54,000 on polystyrene calibration. The copolymer as obtained was used as pressure-sensitive adhesive 1.

EXAMPLE 1

A reactive interlayer of polyallylamine was formed on soft layer 1 in the same manner as in Reference Example 2. After being allowed to stand at room temperature for about 1 week, the sheet was immersed in an ethyl acetate solution containing 5 g (on a solid basis) of pressure-sensitive adhesive 1 prepared in Reference Example 3 per 1,000 ml for about 30 seconds to cause an interfacial contact reaction. The sheet was taken out of the immersion bath, dried to remove ethyl acetate, and allowed to stand at room temperature for about 1 week with its adhesive-treated surface untouched. The adhesion of the adhesive-treated surface before high temperature exposure was 120 g/20 mm-width.

EXAMPLE 2

A reactive interlayer of polyallylamine was formed on soft layer 1 in the same manner as in Reference Example 2. After being allowed to stand at room temperature for about 1 week, the sheet was immersed in a solution prepared by dissolving 5 g (on a solid basis) of adhesive 2 shown below in a 4:1 by volume mixture of ethyl acetate and isopropyl alcohol to make 1,000 ml for about 30 seconds to carry out an interfacial contact reaction. The sheet was taken out, dried to remove the mixed solvent, and allowed to stand at room temperature for about 1 week with its adhesive-treated surface untouched before adhesion measurement. The adhesion of the adhesive-treated surface before high temperature exposure was 280 g/20 mm-width.

Preparation of Pressure-Sensitive Adhesive 2:

A monomer mixture of 70 g of 2-ethylhexyl acrylate, 35 g of acrylic acid, 0.3 g of glycidyl methacrylate, 0.2 g of benzoyl peroxide, and 158 g of ethyl acetate was copolymerized in the same manner as for pressure-sensitive adhesive 1. To the polymerization system was added dropwise 88.2 g of ethyl acetate while stirring to prepare a polymer solution comprising a 2-ethylhexyl acrylate-acrylic acid-glycidyl methacrylate copolymer (solid content: 30%). As a result of GPC, the copolymer was found to have a weight average molecular weight of 553,000 and a number average molecular weight of 82,000 on polystyrene calibration. The copolymer as obtained was used as pressure-sensitive adhesive 2.

EXAMPLE 3

A reactive interlayer of polyallylamine was formed on soft layer 1 in the same manner as in Reference Example 2. After being allowed to stand at room temperature for about 1 day, the interlayer was coated with pressure-sensitive adhesive 3 shown below as diluted with toluene to a concentration of 3.15% to a dry thickness of 1 μm with a Meyer bar No. 16 to conduct an interfacial contact reaction. Toluene was dried, and the sheet was allowed to stand at room temperature for about 1 week while keeping the coated side untouched. The adhesion before high temperature exposure of the adhesive-treated surface was 320 g/20 mm-width.
Preparation of Pressure-Sensitive Adhesive 3:

A hundred parts of natural rubber (weight average molecular weight: ca. 300,000) having been masticated with rolls were dissolved in 300 parts of toluene. A hundred parts of YS Resin Px1150 (terpene tackifier produced by Yasuhara Yushi Kogyo K.K.) were added to the solution and uniformly dissolved therein. To the solution was added 5 parts (on a solid basis) of Coronate L (a 75% ethyl acetate solution of a trimethylolpropane (1 mol)-2,4-tolylene diisocyanate (3 mol) adduct, produced by Nippon Polyurethane Industry Co., Ltd.), followed by stirring to prepare pressure-sensitive adhesive 3.

Since the isocyanate component in pressure-sensitive adhesive 3 thus prepared is liable to be inactivated with time due to reaction with the water content or self-polymerization, application of pressure-sensitive adhesive 3 was completed within 5 hours from the addition of Coronate L.

The results of measurement of adhesion before high temperature exposure (after 20 minutes' standing at room temperature) obtained in Reference Examples 1 to 3 and Examples 1 to 3 are shown in Table 1 below. It is seen from Table 1 that the treatment of Examples 1 to 3 achieved satisfactory tackifying of the surface of soft layer 1.

TABLE 1

|  | 180° Peel Strength before High Temp. Exposure (g/20 mm-width) |
| --- | --- |
| Ref. Example 1 | <5 |
| Ref. Example 2 | <5 |
| Ref. Example 3 | <5 |
| Example 1 | 120 |
| Example 2 | 280 |
| Example 3 | 320 |

REFERENCE EXAMPLE 4

A hundred parts of New Pole PP-4000 were compounded with 14.2 parts of Coronate HX (NCO/OH molar ratio: 1.5), and 0.1 part of dibutyltin dilaurate (curing agent) and 0.2 part of water were added thereto, followed by stirring. The resulting composition was applied to a 25 μm thick polyester film to a thickness of 40 μm with an applicator. The coating layer was covered with a silicone-treated polyester film separator with the silicone-treated side in contact with the coating layer. The resulting laminate was heated in an oven at 70° C. for 10 minutes to cause the coating layer to expand 1.5 times and cure to form soft layer 2 comprising soft polyurethane. After peeling the separator, within 3 hours from the formation of soft layer 2, a reactive interlayer comprising polyallylamine was formed on the soft layer 2 in the same manner as in Reference Example 2. The sheet was rinsed with pure water, air-dried. The sheet was allowed to stand at room temperature for at least 1 week with the reactive interlayer untouched before adhesion measurement. The adhesion of the sheet after high temperature exposure was 110 g/20 mm-width.

EXAMPLE 4

A reactive interlayer of polyallylamine was formed on soft layer 2 in the same manner as in Reference Example 4, and the resulting sheet was left to stand at room temperature for about 4 days. Thereafter, the sheet was immersed in a solution prepared by dissolving 5 g (on a solid basis) of adhesive 1 prepared in Reference Example 3 in ethyl acetate to make 1000 ml for about 30 seconds to effect an interfacial contact reaction. The sheet was taken out of the immersion bath, dried to remove ethyl acetate, and allowed to stand at room temperature for about 4 days with the adhesive-treated surface untouched. The adhesion of the adhesive-treated surface after high-temperature exposure was found to be 300 g/20 mm-width.

The results of measurement of adhesion after high temperature exposure (3 days' aging at 50° C. for 3 days) obtained in Reference Example 4 and Example 4 are shown in Table 2 below. It is seen from Table 2 that the surface of soft layer 2 can be tackified satisfactorily by the treatment of Example 4.

TABLE 2

|  | 180° Peel Strength after High Temp. Exposure (g/20 mm-width) |
| --- | --- |
| Ref. Example 4 | 110 |
| Example 4 | 300 |

A hundred parts of Kraton G1657 (hydrogenated styrene-butadiene-styrene block copolymer produced by shell Japan K.K.; styrene content: 13%) were mixed with 200 parts of LIR-290 (hydrogenated liquid polyisoprene produced by Kuraray Co., Ltd.). The mixture was dissolved in toluene, and 15 parts (on a solid basis) of Coronate L was added thereto. The resulting composition was applied to a 25 μm thick polyester film to a dry thickness of 40 μm with an applicator. The resulting laminate was heated in an oven at 70° C. for 5 minutes to evaporate toluene thereby to form soft layer 3. The sheet was allowed to stand at room temperature for at least 1 week with soft layer 3 untouched before adhesion measurement. The adhesion of the soft layer 3 before high temperature exposure was 25 g/20 mm-width and that after high temperature exposure was 60 g/20 mm-width.

REFERENCE EXAMPLE 6

Soft layer 3 was formed in the same manner as in Reference Example 5. within 3 hours from the formation, the soft layer 3 was subjected to interfacial contact reaction with an aqueous solution of polyallylamine in the same manner as in Reference Example 2 to form a reactive interlayer of polyallylamine. After the sheet was left to stand at room temperature for at least 1 week, the adhesion of the interlayer was measured. The adhesion before and after high temperature exposure was found to be 5 g/20 mm-width or less and 10 g/20 mm-width, respectively.

EXAMPLE 5

A reactive interlayer of polyallylamine was formed on soft layer 3 in the same manner as in Reference Example 6. After being allowed to stand at room temperature for about 1 week, the sheet was immersed in a solution prepared by dissolving 5 g (on a solid basis) of adhesive 1 prepared in Reference Example 3 in ethyl acetate to make 1,000 ml for about 30 seconds to conduct an interfacial contact reaction. The sheet was taken out of the immersion bath, dried to remove ethyl acetate, and allowed to stand at room temperature for about 1 week with the adhesive-treated side untouched. The adhesion of the adhesive-treated layer before and after high temperature exposure was found to be 910 g/20 mm-width and 1,400 g/20 mm-width or greater, respectively. In the peel test after high temperature exposure, when the peel strength reached 1,400 g/20 mm-width, interlaminar separation occurred between the polyester film and the soft layer because of a high anchor effect of the pressure-sensitive adhesive layer.

The results of measurement of adhesion before high temperature exposure (after 20 minutes' standing at room temperature) and after high temperature exposure (aging at 50° C. for 3 days) obtained in Reference Examples 5 and 6 and Example 5 are shown in Table 3 below. Table 3 proves that the treatment of Example 5 satisfactorily tackifies the surface of soft layer 3.

TABLE 3

|  | 180° Peel Strength (g/20 mm-width) | |
|---|---|---|
|  | Before High Temp. Exposure | After High Temp. Exposure |
| Ref. Example 5 | 25 | 60 |
| Ref. Example 6 | <5 | 10 |
| Example 5 | 910 | >1400 |

REFERENCE EXAMPLE 7

A hundred parts of Septon 2063 (hydrogenated styrene-isoprene-styrene block copolymer produced by Kuraray Co., Ltd.; styrene content: 13%) were mixed with 100 parts of Diana Process PW380 (process oil produced by Idemitsu Kosan K.K.) and 6.7 parts of Coronate HX in a pressure kneader. The resulting composition was applied to a 25 μm thick polyester film to a coating thickness of 40 μm with a hot-melt applicator to form soft layer 4. within 3 hours from the formation, the soft layer 4 was subjected to interfacial contact reaction with an aqueous solution of polyallylamine in the same manner as in Reference Example 2, rinsed with pure water, and air dried to form a reactive interlayer of polyallylamine. After the sheet was left to stand at room temperature for at least 1 week with the interlayer being kept untouched, the adhesion of the interlayer was measured. The adhesion before high temperature exposure was found to be 5 g/20 mm-width or less.

EXAMPLE 6

A reactive interlayer of polyallylamine was formed on soft layer 4 in the same manner as in Reference Example 7. After being allowed to stand at room temperature for about 1 week; the sheet was immersed in a solution prepared by dissolving 5 g (on a solid basis) of adhesive 4 prepared as described below in ethyl acetate to make 1,000 ml for about 30 seconds to conduct an interfacial contact reaction. The sheet was taken out of the immersion bath, dried to remove ethyl acetate, and allowed to stand at room temperature for about 1 week with the adhesive-treated side untouched. The adhesion of the adhesive-treated layer before high temperature exposure was 170 g/20 mm-width. Preparation of Pressure-Sensitive Adhesive 4:

A monomer mixture of 100 g of 2-ethylhexyl acrylate, 0.3 g of glycidyl methacrylate, 0.2 g of benzoyl peroxide, and 122.8 g of ethyl acetate was copolymerized in the same manner as in Example 1. To the polymerization system was added 28 g of ethyl acetate was added dropwise while stirring to prepare a polymer solution comprising a 2-ethylhexyl acrylate-glycidyl methacrylate copolymer (solid content: 40%). The copolymer was found to have a weight average molecular weight of 259,000 and a number average molecular weight of 33,000 on polystyrene calibration in GPC. The copolymer as obtained was used as adhesive 4.

EXAMPLE 7

A reactive interlayer of polyallylamine was formed on soft layer 4 in the same manner as in Reference Example 7. After being allowed to stand at room temperature for about 1 week, the sheet was immersed in a solution prepared by dissolving 5 g (on a solid basis) of adhesive 1 prepared in Reference Example 3 in ethyl acetate to make 1,000 ml for about 30 seconds to conduct an interfacial contact reaction. The sheet was taken out of the immersion bath, dried to remove ethyl acetate, and allowed to stand at room temperature for about 1 week with the adhesive-treated side untouched. The adhesion of the adhesive-treated layer before high temperature exposure was 230 g/20 mm-width.

The results of measurement of adhesion before high temperature exposure (after 20 minutes' standing at 23° C.) obtained in Reference Example 7 and Examples 6 and 7 are shown in Table 4 below. It is seen from Table 4 that the treatment of Examples 6 and 7 achieved satisfactory tackifying of the surface of soft layer 4.

TABLE 4

|  | 180° Peel Strength before High Temp. Exposure (g/20 mm-width) |
|---|---|
| Ref. Example 7 | <5 |
| Example 6 | 170 |
| Example 7 | 230 |

REFERENCE EXAMPLE 8

A hundred parts of Kraton D1107 (styrene-isoprene-styrene block copolymer produced by shell Japan K.K.; styrene content: 15%) were mixed with 50 parts of Diana Process Pw380 and 6.7 parts of Coronate HX in a pressure kneader. The resulting composition was applied to a 25 μm thick polyester film to a coating thickness of 40 μm with a hot-melt applicator to form soft layer 5. within 3 hours from the formation, the soft layer 5 was subjected to interfacial contact reaction with an aqueous solution of polyallylamine in the same manner as in Reference Example 2, rinsed with pure water, and air dried to form a reactive interlayer of polyallylamine. The sheet was allowed to stand at room temperature for at least 1 week with its interlayer side untouched. The adhesion of the interlayer after high temperature exposure was 10 g/20 mm-width.

EXAMPLE 8

A reactive interlayer of polyallylamine was formed on soft layer 5 in the same manner as in Reference Example 8. After allowing to stand at room temperature for about 1 week, the sheet was immersed in a solution prepared by dissolving 5 g (on a solid basis) of adhesive 1 prepared in Reference Example 3 in ethyl acetate to make 1,000 ml for about 30 seconds to conduct an interfacial contact reaction. The sheet was taken out of the immersion bath, dried to remove ethyl acetate, and allowed to stand at room temperature for about 1 day with the adhesive-treated side untouched. The adhesion of the adhesive-treated layer after high temperature exposure was

EXAMPLE 9

A reactive interlayer of polyallylamine was formed on soft layer 5 in the same manner as in Reference Example 8. After allowing to stand at room temperature for about 1 week, the sheet was immersed in a solution prepared by dissolving 5 g (on a solid basis) of adhesive 2 prepared in Example 2 in a 4/1 (by volume) mixture of ethyl acetate and isopropyl alcohol to make 1,000 ml for about 30 seconds to conduct an interfacial contact reaction. The sheet was taken out of the solution, dried to remove the mixed solvent, and allowed to stand at room temperature for about 1 day with the adhesive-treated side untouched. The adhesion of the adhesive-treated layer after high temperature exposure was 1,080 g/20 mm-width.

The results of measurement of adhesion after high temperature exposure (3 days' aging at 50° C.) obtained in Reference Example 8 and Examples 8 and 9 are shown in Table 5 below. It is seen from Table 5 that the treatment of Examples 8 and 9 achieved satisfactory tackifying of the surface of soft layer 5.

TABLE 5

|  | 180° Peel Strength after High Temp. Exposure (g/20 mm-width) |
|---|---|
| Ref. Example 8 | 10 |
| Example 8 | 840 |
| Example 9 | 1080 |

While the invention has been described in detail and with reference to specific examples thereof, it will be apparent to one skilled in the art that various changes and modifications can be made therein without departing from the spirit and scope thereof.

What is claimed is:

1. A method for tackifying a surface of a soft layer which has insufficient surface adhesion, which comprises tackifying the surface of the soft layer by an interfacial contact reaction between the soft layer and a pressure-sensitive adhesive layer, wherein the interfacial contact reaction is a reaction between a reactive functional group contained in the soft layer and the pressure-sensitive adhesive layer having a reactive functional group capable of reacting with said functional group of the soft layer.

2. The method as claimed in claim 1, wherein said pressure-sensitive adhesive layer has a thickness of 10 $\mu$m or smaller.

3. The method as claimed in claim 1, wherein said pressure-sensitive adhesive layer has a thickness of 1 $\mu$m or smaller.

4. The method as claimed in claim 1, wherein said interfacial contact reaction is a reaction between a primary or secondary amino group and a functional group selected from the group consisting of an isocyanate group, an epoxy group, an acid chloride group, a vinyl group, and an acid anhydride group.

5. The method as claimed in claim 1, wherein said interfacial contact reaction further comprises a reaction between a reactive interlayer previously provided on the soft layer and the pressure-sensitive adhesive layer.

6. The method as claimed in claim 5, wherein said reactive interlayer comprises a polyamine having a primary or secondary amino group.

* * * * *